United States Patent

Van Spijk

[11] Patent Number: 5,833,445
[45] Date of Patent: Nov. 10, 1998

[54] ROTARY PUMP HAVING A COMPENSATING COUPLING

[75] Inventor: Johannes Gerardus Ludovicus Maria Van Spijk, Drunen, Netherlands

[73] Assignee: Van Doorne's Transmissie B.V., Tilburg, Netherlands

[21] Appl. No.: 762,060

[22] Filed: Dec. 9, 1996

[30] Foreign Application Priority Data

Dec. 8, 1995 [NL] Netherlands ............................ 1001855

[51] Int. Cl.$^6$ ........................... F04C 2/344; F04C 15/00; F16D 3/06
[52] U.S. Cl. ........................... 418/182; 403/354; 464/162
[58] Field of Search ........................... 418/182; 403/113, 403/354, 375; 464/157, 162

[56] References Cited

U.S. PATENT DOCUMENTS

| | | | |
|---|---|---|---|
| 1,109,006 | 9/1914 | Neal | 464/162 |
| 2,192,588 | 3/1940 | Heckert | 418/182 |
| 3,097,610 | 7/1963 | Swanson | 418/182 |
| 3,286,913 | 11/1966 | Kaatz et al. | 418/150 |
| 4,541,791 | 9/1985 | Ideta et al. | 418/182 |

FOREIGN PATENT DOCUMENTS

| | | |
|---|---|---|
| 2 321 612 | 3/1977 | France . |
| 2 322 280 | 3/1977 | France . |
| 546678 | 7/1956 | Italy ........................................ 418/182 |
| 2 028 429 | 3/1980 | United Kingdom . |

*Primary Examiner*—John J. Vrablik
*Attorney, Agent, or Firm*—Young & Thompson

[57] ABSTRACT

The rotary pump, which in particular is suitable for use in a continuously variable transmission, is provided with a pump housing and a rotor with a drive shaft. Movable displacement elements are accommodated in the grooves of the rotor. The rotor is surrounded by a cam ring. End faces adjoin the two side faces of the rotor, at least one end face being provided with one or more feed and/or discharge openings. The cam ring, the rotor, the displacement elements and the end faces delimit pump chambers. A rotationally stable compensating coupling, which is mounted in bearings in the pump housing, is arranged between the rotor and the drive shaft. The mounting in the pump housing engages around the compensating coupling and adjoins one running face of the rotor.

12 Claims, 4 Drawing Sheets

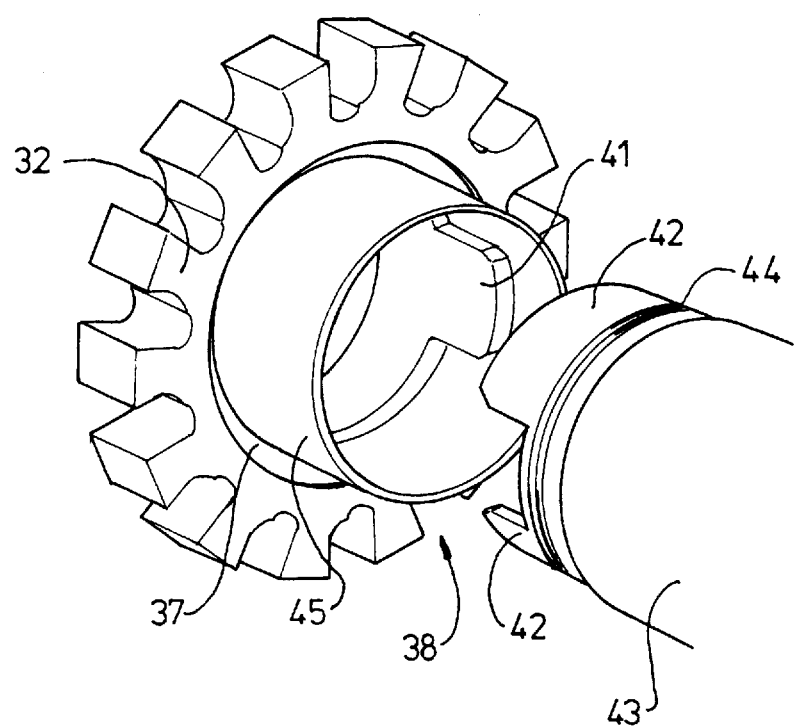

ROTARY PUMP HAVING A COMPENSATING COUPLING

The invention relates to a rotary pump, in particular for use in a transmission of a motor vehicle, provided with a pump housing, a rotor with a drive shaft, displacement elements movable in grooves in the rotor, a cam ring surrounding the rotor, and end faces adjoining both side faces of the rotor, at least one of which end faces is provided with one or more feed and/or discharge openings, the cam ring, the rotor, the displacement elements and the end faces delimiting pump chambers and a rotationally stable compensating coupling being arranged between the rotor and the drive shaft.

A pump of this type is disclosed in U.S. Pat. No. 2,192,588. With this pump a compensating coupling is incorporated between the rotor and the drive shaft to compensate for misalignment between the shafts as a consequence of movements other than rotation and deformations of the drive shaft, such as oscillation, so that these movements are not transmitted to the rotor. Because the rotor must closely adjoin the end faces and the cam ring, these movements would otherwise lead to problems, such as leakage losses and seizing of the pump. One problem with this pump is the relatively complex construction of this coupling with a large number of elements and bearings, which also results in a long construction length in the axial direction.

The aim of the invention is to overcome this drawback. According to the invention, the rotary pump is characterised in that the compensating coupling is essentially of bush-shaped construction and is mounted in bearings in the pump housing, and in that said mounting in the pump housing engages around the compensating coupling and adjoins an end face of the rotor. With this construction according to the invention, by means of the said coupling in conjunction with mounting thereof in bearings in the pump housing, a very compact construction length, which is short viewed in the axial direction, is obtained, both for the torque/rotation transfer with compensating facility and for the mounting. That is to say, rotation of the drive shaft is transmitted by the coupling to the rotor but other movements and deformations are compensated for by the coupling in such a way that these are not transmitted, or are barely transmitted, to the rotor.

In particular, the coupling means are integrated with the drive shaft and the rotor. In this case no supplementary components are necessary and the coupling can be made simple, inexpensive and compact.

According to the invention, the connection between the coupling means and the rotor can be play-free and the connection between the coupling means and the drive shaft can be compensating. However, it is also possible for the connection between the coupling means and the drive shaft to be play-free and the connection between the coupling means and the rotor to be compensating. As an alternative, the coupling means can have a compensating connection to both the rotor and the drive shaft. In this way it is possible to choose the most optimum coupling depending on the drive shaft and the load thereon in combination with the design of the rotary pump and the available installation space.

In particular, the coupling can comprise one or more dog couplings. Said dog coupling can be mounted either simply integrated with the drive shaft and/or the rotor or in supplementary coupling means. The dog coupling guarantees a rotationally stable coupling, whilst some movement and deformation is possible in other directions.

According to the invention, the coupling means are mounted in the housing of the rotary pump, preferably in one or more bearings. In particular, the bearings can comprise one or more plain bearings. The coupling means are thus retained in a stable position with respect to the rotary pump, whilst good rotation is nevertheless possible. According to a further development of the invention, the coupling means comprise a hollow shaft or bush. With this arrangement the drive shaft can be accommodated in the hollow shaft with a rotationally stable and compensating coupling. The hollow shaft can be accommodated in a rotationally stable manner in the rotor. In this way a compact, stable assembly is obtained. An elastic element can be fitted for further centring of any play between the rotor, the drive shaft and/or the coupling, which elastic element can, for example, also serve as a seal.

Apertures and ducts can be provided in the vicinity of the coupling means in the rotary pump for removal of fluid leakage losses which can occur at the coupling means.

The invention will be explained on the basis of an illustrative embodiment with reference to the drawings, in which:

FIG. 4 shows a perspective view of the compensating coupling means for the rotary pump in FIG. 3.

Figure 1:
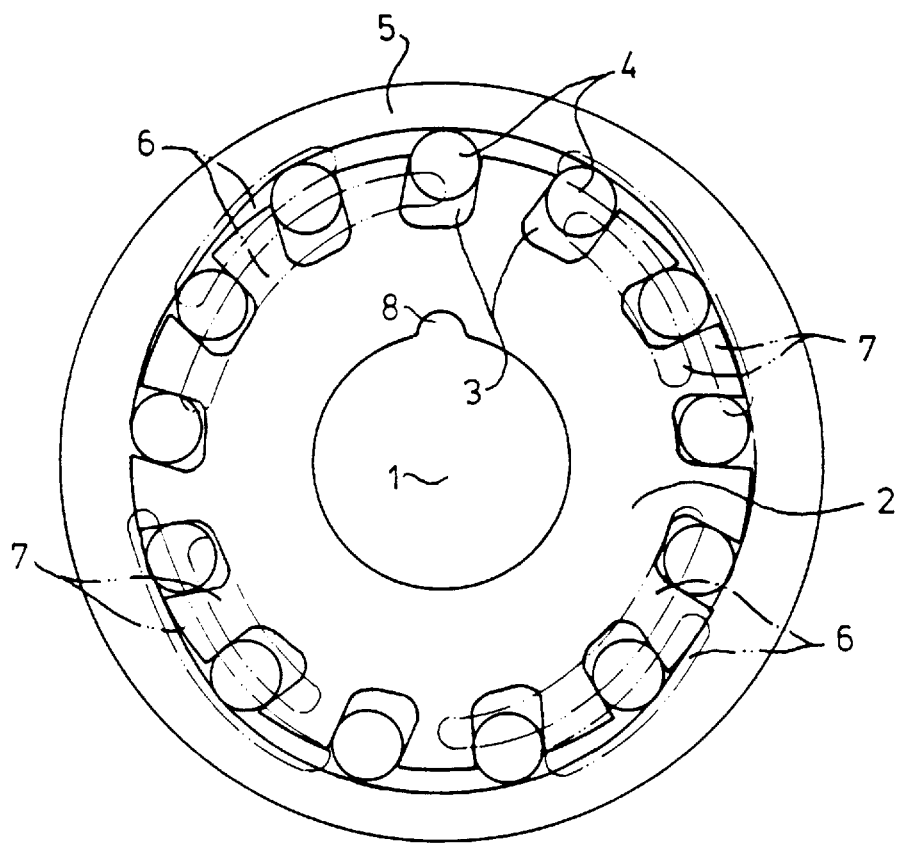
FIG. 1 shows, diagrammatically, a rotary pump according to the prior art.

The rotary pump according to FIG. 1 comprises a drive shaft 1 with a rotor 2 fixed thereto by means of a keyed joint 8 or other connection means. The rotor 2 has a number of grooves 3, in which displacement elements 4 are arranged. In the rotary pump shown the displacement elements are in the form of rollers, but other elements, such as, for example, vanes, are also conceivable. A cam ring 5 is also fitted. The rotor 2, the displacement elements 4, the cam ring 5 and the end faces 9 and 10, shown in FIG. 2, delimit a number of pump chambers, the volume of which increases and decreases during rotation of the rotor 2. Fluid is supplied and removed by means of two pairs of feed openings 6 and two pairs of discharge openings 7.

Figure 2:
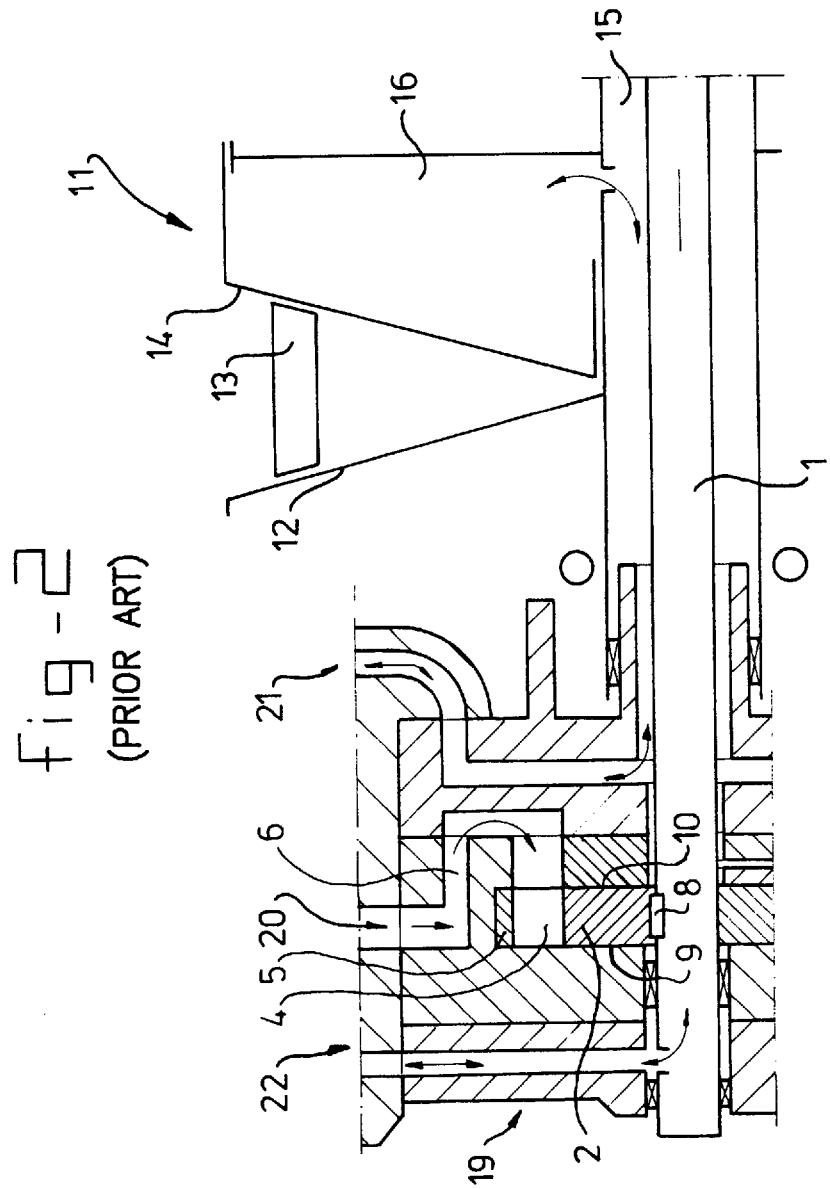
FIG. 2 shows the rotary pump according to FIG. 1 in combination with part of a continuously variable transmission.
Figure 3:
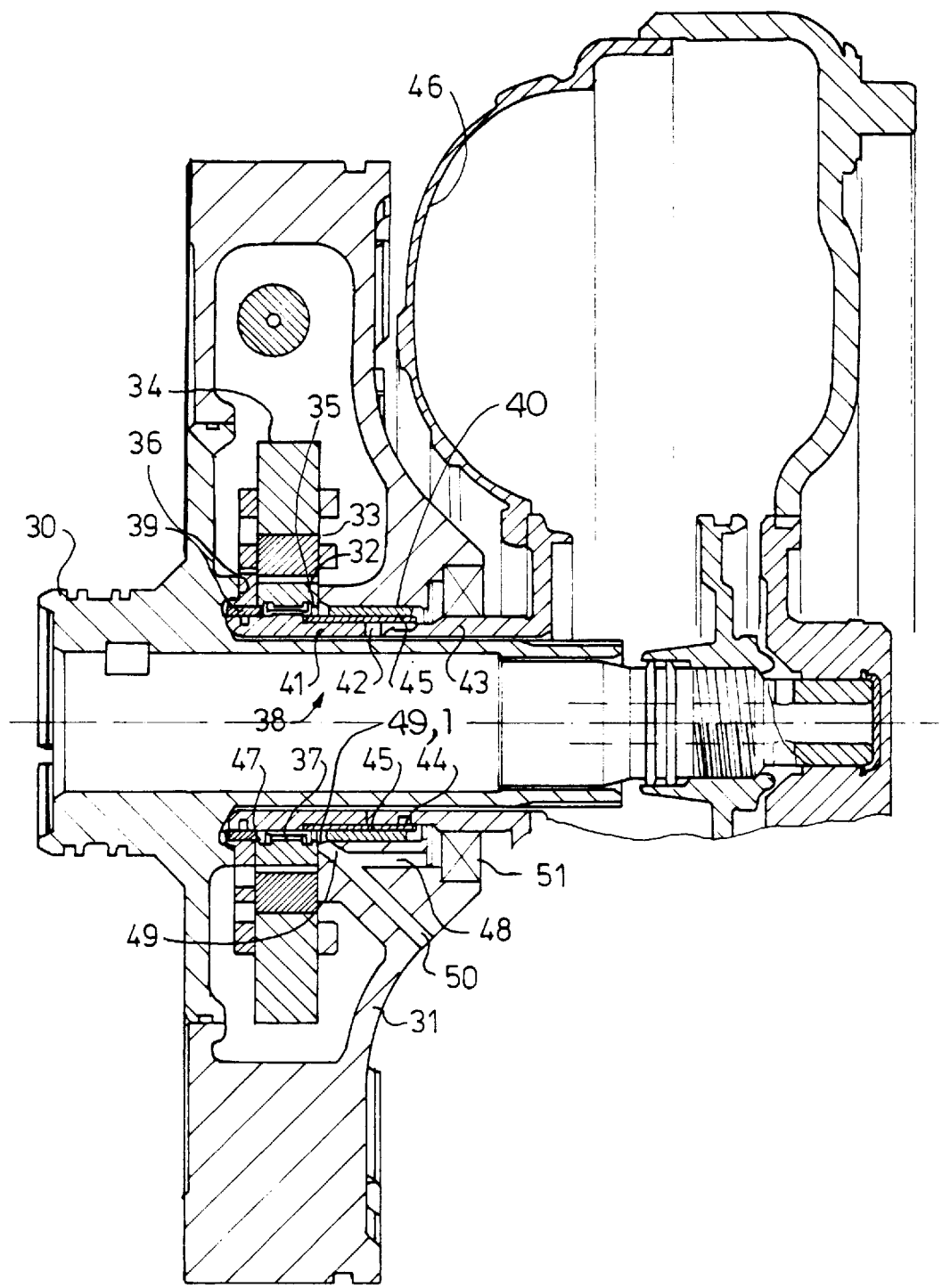
FIG. 3 shows, diagrammatically, a rotary pump according to the invention in combination with a torque converter, which is shown in part.

The rotary pump according to FIG. 1 is very suitable for use in continuously variable transmissions since this pump is capable of producing high pressures with appreciable flow. The functioning and construction of a continuously variable transmission are assumed to be known here. Only part of the primary pulley of the transmission 11 according to FIG. 2 is shown, with a drive belt 13 pinched within it. The primary pulley consists of two discs 12, 14, disc 14 of which is movable over shaft 15. This movement is produced by supplying and removing fluid between shaft 15 and drive shaft 1 to and from cylinder 16. Shaft 15 is positioned co-axially around drive shaft 1, to which the rotor 2 of rotary pump 19 is attached.

Pump 19 is supplied with fluid from the feed opening 20, whilst fluid is removed via a discharge opening, which is not shown here, to a hydraulic regulator, which is likewise not shown here. Said hydraulic regulator also supplies fluid, which can be fed via pipe 21 and between shafts 15 and 1 here, to or from cylinder 16. The hydraulic regulator also supplies fluid via pipe 22 and the hollow drive shaft 1.

It will be clear that for the pump to function correctly and at optimum efficiency, the cam ring 5, the displacement elements 4 and, in particular, the rotor 2 must abut the end faces 9 and 10 as tightly as possible in order as far as possible to prevent leakage losses occurring at this location. However, because the rotor 2 in this known pump is connected to the drive shaft 1 by means of the key 8 such that it is dimensionally stable, all deformations and movements of the drive shaft 1 are also transmitted directly to the rotor. Because the rotor extends radially, the deformations and movements of the drive shaft 1 are possibly even intensified. This can lead to seizing of the rotor 2 and to leakage losses between the rotor 2 and the end faces 9 and 10.

The deformations and movements of the drive shaft 1, such as oscillation thereof, can be appreciable. This is the case in particular when the shaft is of relatively thin construction and is possibly even provided with openings for the passage of fluid. The movements and deformations of the drive shaft 1 can, moreover, be further intensified by the use of relatively flexible components in the drive line, to which the drive shaft 1 can be connected. This is the case, for example, when a torque converter with a relatively flexible connection to the crank shaft is used.

The housing of the rotary pump according to the invention consists of two housing sections 30 and 31. The rotary pump once again has the rotor 32, displacement elements 33, a cam ring 34 and two end faces 35 and 36. The rotor 32 is connected to the rotationally stable compensating coupling 38 by means of a positive connection 37, which can be produced in various ways. Said coupling 38 is mounted, by means of the plain bearings 39 and 40, in section 31 of the pump housing.

As is shown in more detail in FIG. 4, the coupling 38 in this case comprises two protruding dogs 41, although other coupling elements which provide a rotationally stable compensating coupling are also conceivable. The term compensating is used to denote that play is provided to allow some mutual movement and deformation between the shafts in the axial direction and in a direction deviating from the axial direction, whilst, nevertheless, a rotationally stable coupling and drive is still assured. The dogs 41 engage with complementary dogs 42, which are arranged on the drive shaft 43, which forms part of the torque converter 46. The two pairs of dogs 41 and 42 are constructed such that, apart from a mutual axial movement, a slight bending movement occurring in a longitudinal plane running through the axial shaft is also possible. To this end, inter alia, the two protruding dogs 42 are constructed such that they project slightly conically inwards. This play allows alignment errors between the shaft 1 and the shaft 43 to be permitted. The dogs 41 are enclosed by and fixed to the cylindrical section 45 of the coupling. The drive shaft 43 is also sealed against said cylindrical section 45 of the coupling by means of the elastic sealing ring 44. Said sealing ring also centres the play present between the drive shaft 43 and the cylindrical section 45 of the coupling. In this way the gap between, on the one side, 30 and, on the other side, 38, 43 is sealed off and is suitable for the passage of fluid, such as oil, for the torque converter function.

Furthermore, the annular joint 37 is constructed such that this is able to execute a ball joint-like movement to compensate for any angular errors between the bearings 39, 40 and the end faces 35, 36, for example resulting from wearing down of the mounting.

The drive shaft 43 is connected to the torque converter 46. Said torque converter 46, like torque converters in general, is constructed to be relatively supple. If the torque converter 46 and the drive shaft were to be connected directly to the rotor 32, the deformations and movements of the torque converter would also be transmitted to the rotor 32, which can lead to leakage losses over the end faces 35 and 36 and to seizing of the rotor 32. As a result of the use of the said coupling 38, however, a rotationally stable compensating connection between the rotor 32 and the drive shaft 43 is obtained. The dogs 41 and 42 guarantee a rotationally stable connection, whilst some movement and deformation is possible in the other directions, such as in the axial direction and in a direction deviating from the axial direction. By virtue of its elastic properties, the sealing ring 44 also provides for centring of the play between the dogs 41 and 42. Said ring 44 also prevents fluid leakage losses between the rotor 32 and the end faces 35 and 36 as far as possible and the rotor 32 is prevented from seizing.

Because of the presence of bush 45 around the coupling 38 in conjunction with mounting thereof in plain bearing 40, a particularly compact construction length, which is short when viewed in the axial direction, is obtained both for torque transmission with compensating facility and for the mounting. Consequently, the supporting of the torque converter also acts, via the said elements, directly on the mounting, so that, as a result, no bending moments are produced in the shafts.

Some fluid leakage losses will always occur between the end faces 35 and 36, respectively, and the rotor 32. As a result of the use of the plain bearings 39 and 40 and the coupling of the rotor 32 to the coupling 38, discharge of the fluid originating from the leakage between the end faces 35 and 36, respectively, is difficult. For this reason a passage 49 for fluid has been made at the location of the joint between the rotor 32 and the coupling 38. In this case said passage is an integral part of the positive connection, but holes can also be made in the rotor 32 and/or the coupling 38. As a result said fluid runs into the fluid originating from the leakage between the rotor 32 and end face 35. A duct 49 is provided to remove this fluid. A restriction 49.1 can be made in said duct, providing a possibility for influencing the lubricating conditions for the plain bearings. The smaller the restriction opening, the more oil is forced to escape via the bearings. The duct 49 joins a duct 48 for removal of fluid originating from leakage through bearing 51. From there, the fluid originating from these leakage losses is fed via the duct 50 from the rotary pump to the transmission.

I claim:

1. In a rotary pump, in particular for use in a transmission of a motor vehicle, provided with a pump housing, a rotor with a drive shaft, displacement elements movable in grooves in the rotor, a cam ring surrounding the rotor, and end faces adjoining both side faces of the rotor, at least one of which end faces is provided with at least one feed or discharge opening, the cam ring, the rotor, the displacement elements and the end faces delimiting pump chambers, and a rotationally stable, dog-shaped compensating coupling between the rotor and the drive shaft for compensating possible misalignment of the drive shaft and the rotor; the improvement wherein the compensating coupling (38) is mounted in a bearing (40) in the pump housing (31), and said bearing (40) in the pump housing (31) engages around the coupling (38) and adjoins an end face (35) of the rotor (32), and a bush (45) between said bearing (40) and said coupling (38).

2. Rotary pump according to claim 1, wherein the compensating coupling includes interengaging elements that are integral respectively with the drive shaft (43) and the rotor (32).

3. Rotary pump according to claim 1, wherein the connection between the compensating coupling and the rotor is play-free and the connection between the compensating coupling and the drive shaft is compensating.

4. Rotary pump according to claim 1, wherein the connection between the compensating coupling and the drive shaft is play-free and the connection between the compensating coupling and the rotor is compensating.

5. Rotary pump according to claim 1, wherein the connection between the compensating coupling and the rotor and the connection between the compensating coupling and the drive shaft are both compensating.

6. Rotary pump according to claim 1, wherein the compensating coupling comprises one or more dog couplings (41, 42).

7. Rotary pump according to claim 1, wherein the compensating coupling is mounted in one or more bearings.

8. Rotary pump according to claim 7, wherein the bearings comprise one or more plain bearings (40, 39).

9. Rotary pump according to claim 1, wherein the drive shaft (43) is accommodated in the bush (45) with a rotationally stable and compensating coupling and the bush is accommodated in a rotationally stable manner in the rotor (32).

10. Rotary pump according to claim 9, wherein the drive shaft (43) is a hollow shaft which is placed axially around the shaft of the motor vehicle transmission, which is constructed as a continuously variable transmission.

11. Rotary pump according to claim 1, wherein apertures and ducts for removing fluid leakage losses are provided in the rotary pump in the vicinity of the compensating coupling.

12. Rotary pump according to claim 11, wherein the ducts merge in the housing of the rotary pump.

\* \* \* \* \*